United States Patent [19]
Van Driel et al.

[11] Patent Number: 5,598,287
[45] Date of Patent: Jan. 28, 1997

[54] MULTIPLE ACCESS TELECOMMUNICATION NETWORK

[75] Inventors: Carel-Jan L. Van Driel; Atul N. Sinha, both of Eindhoven, Netherlands

[73] Assignee: U.S. Philips Corporation, New York, N.Y.

[21] Appl. No.: 541,573

[22] Filed: Oct. 10, 1995

Related U.S. Application Data

[63] Continuation of Ser. No. 151,319, Nov. 12, 1993, abandoned.

[30] Foreign Application Priority Data

Nov. 19, 1992 [EP] European Pat. Off. .............. 92203569

[51] Int. Cl.$^6$ .............................. H04J 14/02; H04B 10/04
[52] U.S. Cl. ...................... 359/125; 359/137; 359/184; 379/56; 455/89
[58] Field of Search .......................... 359/125, 136–137, 359/145–146, 118, 157, 168, 184; 370/11, 71; 375/239; 379/56; 455/89

[56] References Cited

PUBLICATIONS

Sierens et al., "Subcarrier Multiple Access for Passive Optical Networks and Comparison to Other Multiple Access Techniques", GLOBECOM '91 (IEEE Global Telecommunications Conference, Conference Record, vol. 1, pp. 619–623. 2–5 Dec. 1991.

"Optical Interference in Subcarrier Multiplexed Systems with Multiple Optical Carriers" C. Desem, IEEE Journal on Selected Areas in Communication, vol. 8, No. 7, Sep. 1990, pp. 1290–1295.

"Wide Band Lightwave Distribution System Using Subcarrier Multiplexing" T. E. Darcy et al, IEEE Journal of Lightwave Technology, vol. 7, No. 6, Jun. 1989, pp. 997–1005.

"256-QAM Subcarrier Transmission for Broadband Distribution Networks", by H. Ohtsuka et al, IEEE, 1991, pp. 1817–1822.

*Primary Examiner*—Wellington Chin
*Assistant Examiner*—Kinfe-Michael Negash
*Attorney, Agent, or Firm*—Leroy Eason

[57] ABSTRACT

In a multiple access network the signals transmitted by a plurality of sub-stations to a main station over a common channel must be distinguished for each sub-station. A method of achieving this is to employ SCMA (Subcarrier Multiple Access), according to which in each sub-station the transmit signal is modulated on a subcarrier having a different frequency for each substation, and the modulated subcarrier amplitude modulates a main carrier which has substantially the same frequency for all sub-stations. To minimize mutual interference between sub-stations, according to the invention the amplitude of the main carrier transmitted by a sub-station is reduced during intervals in which the modulated auxiliary signal from that sub-station is not present or is at a zero reference level. In this way the number of modulated carrier signals which are present at any given time is reduced. Mutual interference is thereby significantly reduced, because it depends on the squared number of carriers present in the system.

4 Claims, 4 Drawing Sheets

MULTIPLE ACCESS TELECOMMUNICATION NETWORK

This is a continuation of application Ser. No. 08/151,319, filed Nov. 12, 1993 now abandoned.

BACKGROUND OF THE INVENTION

1. Field of the Invention

The invention relates to a telecommunication network comprising a main station coupled to a plurality of sub-stations over a channel, each sub-station comprising an auxiliary modulator for generating an auxiliary signal by modulation of an input signal on a subcarrier having a frequency that is different for each sub-station, and a modulator for deriving a modulated transmit signal from the auxiliary signal.

The invention likewise relates to a sub-station to be used in a telecommunication network defined above.

2. Description of the Related Art

A telecommunication network as defined in the opening paragraph is known from the journal article "Optical Interference in Subcarrier Multiplexed Systems with Multiple Optical Carriers" by C. Desem in IEEE Journal on Selected Areas in Communication, Vol. 8, No. 7, September 1990, pp. 1290–1295.

Such transmission systems are used for communication between a main station and a plurality of sub-stations over a channel used in common by the substations. This channel may be formed, for example, by a glass fibre, a coaxial cable or a radio link. Applications of such transmission systems are, for example, passive optical networks, local area networks, satellite communication systems and mobile telephone systems.

In telecommunication networks utilizing a common channel for all the sub-stations it is to be ensured that no or only little mutual interference is caused by sub-stations simultaneously transmitting information to the main station.

Generally, this may be achieved by giving the signals to be transmitted by the sub-stations their own frequencies, so that at the main station, for example, by means of frequency selective filters, the signals coming from different sub-stations may be separated. Another option is making a different time slot in a frame available to each sub-station, so that only a single sub-station at a time transmits a signal to the main station.

A simple alternative to said methods is the telecommunication network known from said journal article, in which sub-stations are used which generate a transmit signal with a carrier frequency that may be about the same for the various sub-station This carrier frequency is modulated, for example, in amplitude (or intensity), frequency or phase by an auxiliary signal which itself is obtained by modulation of an input signal on a subcartier which is of different frequencies for the various sub-stations.

The receiver in the main station comprises a demodulator followed by separating means for separating the signals coming from the different sub-stations. These separating means may comprise, for example, band filters or synchronous detectors followed by low-pass filters.

Said journal article describes that interference may be expected from other sub-stations on the signal coming from a specific sub-station. This interference is caused by interference of different carriers having a substantially equal frequency in the receiver of the main station. The intensity of this interference depends, among other things, on the bandwidth of the auxiliary signal, the spectral bandwidth of the carrier, on differences of the carrier frequencies of different sub-stations and on the number of sub-stations. The interference increases with the number of sub-stations and decreases as the frequency difference between different carriers and the spectral bandwidth of the carrier increase.

In practice the maximum data transfer rate of such prior-art communication network is restricted by this mutual interference caused by signals coming from different sub-stations.

SUMMARY OF THE INVENTION

It is an object of the invention to provide a telecommunication network as defined in the opening paragraph in which the mutual interference by sub-stations is reduced considerably. For this purpose, the invention is characterized in that the substations comprise reducing means for reducing the mean amplitude of the transmit signal when the amplitude of the auxiliary signal is reduced.

Reducing the mean amplitude of the transmit signal if the auxiliary signal has a reduced amplitude has the effect of power reduction or, depending on the value of the reduction of the mean amplitude of the transmit signal, even the effect of disabling the transmit signal concerned. This achieves that the number of effective carriers available in the telecommunication network at a specific instant is reduced on average. Since the mutual interference depends on the squared number of carriers available in the system, the measures according to the invention result in a considerable reduction of the mutual interference.

A first situation in which the amplitude of the auxiliary signal is reduced occurs, for example, when the auxiliary modulator is an amplitude modulator in which the auxiliary signal is obtained by enabling and disabling the subcarrier in response to the source signal to be transmitted. If the subcarrier is disabled (for example, for 50% of the time), the (mean) amplitude of the carrier can be reduced.

A second situation in which the amplitude of the auxiliary signal is reduced is the case where the information transfer is effected in bursts. It is then advantageous to reduce the (mean) amplitude of the transmit signal in the absence of the auxiliary signal when no information transfer takes place.

It is conceivable that the subcarrier is not fully disabled, but that the amplitude of the subcarrier always retains a minimum value.

An embodiment of the invention is characterized in that the sub-stations comprise coding means for converting the input signal into a coded signal which, compared with the input signal, is active for a shorter fraction of time.

By utilizing a coded signal which is active for a shorter fraction of time the power of the transmit signal can be reduced for a longer period of time, so that the number of effective sub-stations and thus the interference caused by them is reduced considerably. To keep the energy per bit at a constant level, the coded signal is to have an increased ratio of peak power to mean power.

A further embodiment of the invention is characterized in that the coded signal comprises a pulse position modulated signal.

Pulse-position modulation is a simple coding method by which the fraction of time in which the signal is active can be reduced. Other conceivable codes are, for example, codes in which the information is coded in the positions of a small number of pulses in lieu of the position of a single pulse.

BRIEF DESCRIPTION OF THE DRAWINGS

The invention will be further explained with reference to the drawing Figures in which.

DETAILED DESCRIPTION OF THE PREFERRED EMBODIMENTS

Figure 1A:
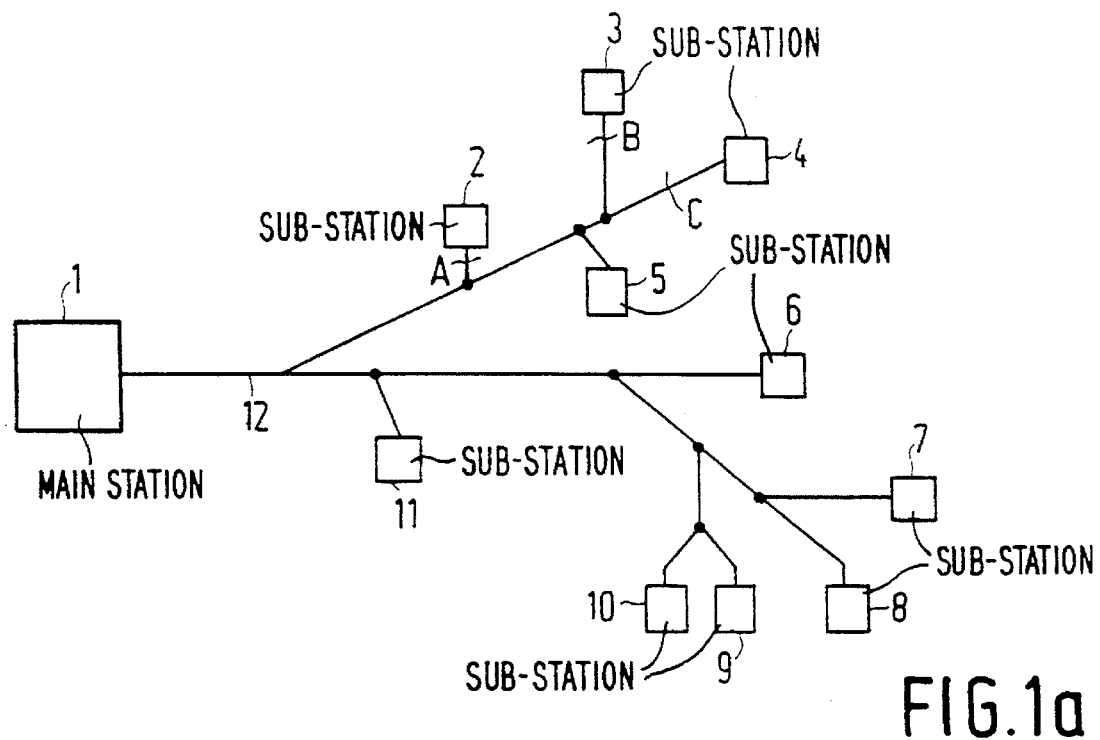
FIG. 1a shows a passive optical network in which the invention can be implemented.

The telecommunication network shown in FIG. 1a comprises a main station 1 connected to the sub-stations 2 to 11 over the channel in this case being an optical fibre network 12. At the junctions the light emitted by the main station 1 is split up for further distribution through the network to the sub-stations 2 to 11. Light signals emitted by the sub-stations are combined in the junctions to form a combined light signal to be transmitted to the main station.

Figure 1B:
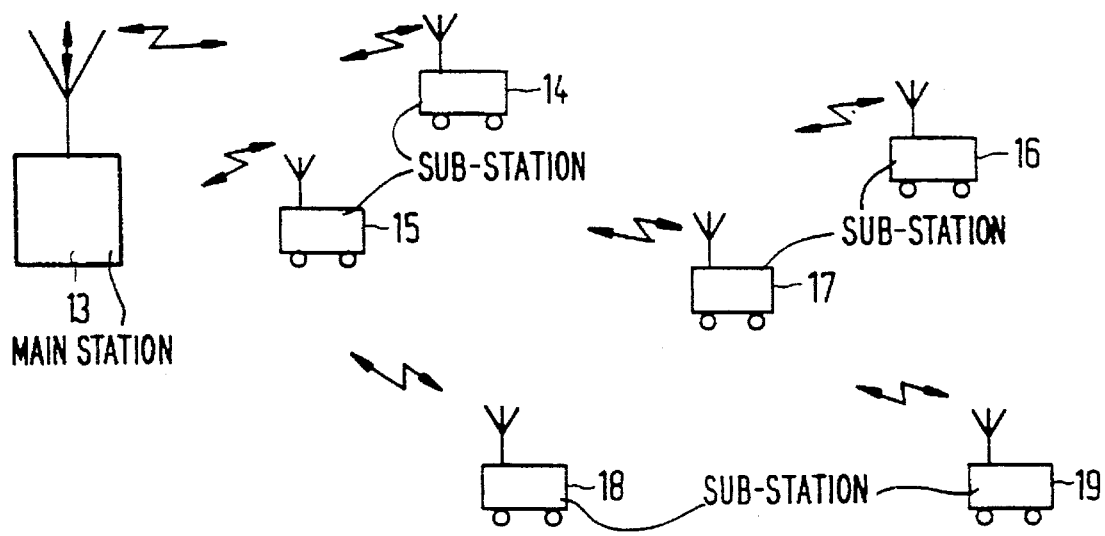
FIG. 1b shows a telecommunication network for mobile communication in which the invention can be implemented.

The telecommunication network shown in FIG. 1b comprises a main station 13 capable of exchanging information with a plurality of mobile sub-stations 14 to 19 over the channel which in this case is a radio link.

Since in both the network shown in FIG. 1a and the network shown in FIG. 1b all sub-stations use a channel in common, these networks need measures to avoid mutual interference by simultaneously transmitting sub-stations.

Figure 2:
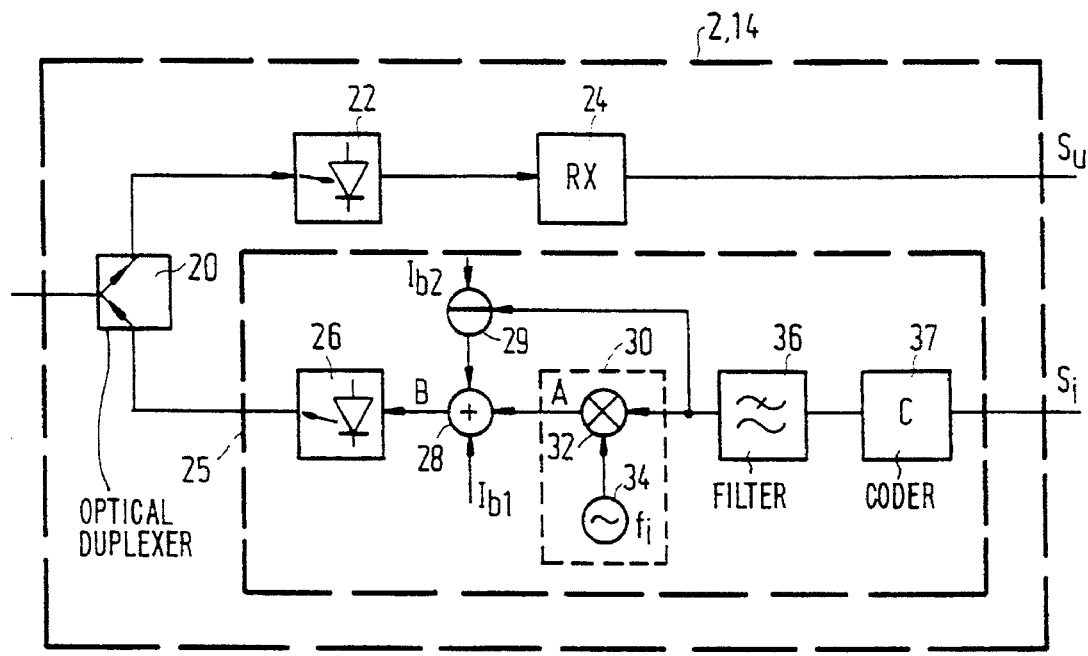
FIG. 2 shows a sub-station to be used in a telecommunication network according to the invention.

At the sub-station 2 shown in FIG. 2 the input signal $S_i$ is applied to a transmitter 25. In the transmitter 25 the input signal $S_i$ is applied to an input of a lowpass filter 36 via coding means 37. The output of the low-pass filter 36 is connected to an input of an auxiliary modulator 30. The auxiliary modulator 30 comprises an oscillator 34 for generating the subcarrier having a frequency $f_i$. The input of the auxiliary modulator 30 is connected to a first input of a multiplier circuit 32 and the output of the oscillator 34 is connected to a second input of the multiplier circuit 32. The output of the multiplier circuit 32, likewise forming the output of the auxiliary modulator 30, is connected to a first input of an adder circuit 28. A constant value is applied to a second input of the adder circuit 28 while a value $I_{b2}$ from a controllable current source 29 is applied to a third input of the adder circuit. The controllable current source 29 is controlled in response to the output signal of the low-pass filter 36. The controllable current source 29 forms the reducing means for reducing the mean amplitude of the transmit signal according to the inventive idea. The output of the adder circuit 26 is connected to an input of a modulator in this case being an electrooptical converter 26. The output of the electrooptical converter 26, having the transmit signal for its output signal, is connected to a first input of an optical duplexer 20. An output of the optical duplexer 20 is connected to an optoelectrical converter 22 whose output is connected to the input of a receiver 24. An output signal $S_u$ is available at the output of the receiver 24.

In the embodiment shown in FIG. 2 it is assumed that the input signal $S_i$ comprises digital symbols whose binary "0" and "1" values respectively, are represented by voltages having the values 0 and +V. The output of the auxiliary modulator 30 then carries an auxiliary signal formed by a subcarrier having a frequency $f_i$ amplitude modulated by the coded and filtered input signal $S_i$. The frequency of the subcarrier is generally different for different sub-stations. However, it is conceivable that a combination of TDMA (Time-Division Multiple Access) and SCMA (SubCarrier Multiple Access) is used where different sub-stations transmit in different time slots in a frame, so that it is possible to choose the same frequency of the subcarrier for a number of sub-stations. If the signal $S_i$ is active, an additional current $I_{b2}$ is applied to the adder circuit 28 by the current source 29, so that a value $I_{b1}+I_{b2}$ is added to the modulated carrier by the adder circuit 28. The value $I_{b2}$ is selected to exceed or be equal to the amplitude of the modulated subcarrier, as a result of which the minimum value of the input signal of the electrooptical converter 26 is equal to $I_{b1}$. If the subcarrier is disabled by the signal $S_i$ (signal $S_i$ inactive), the current produced by the current source 29 is reduced and, according to the inventive idea, the input signal of the electrooptical converter 26 is reduced to the residual value $I_{b1}$. The low-pass filter 36 provides a limitation of the bandwidth of the output signal of the coder 37 so as to limit the bandwidth of the transmit signal. In the situation discussed here the input signal of the electrooptical converter is converted into intensity variations of the optical signal. The electrooptical converter 26 feeds the optical transmit signal to the channel through the duplexer 20. By reducing the signal B on the input of the electrooptical converter, the amplitude of the transmit signal is likewise reduced, so that the mutual interference of the sub-stations is reduced.

A signal received from the channel is applied to the optoelectrical converter 22 via the duplexer 20. The receiver 24 extracts the signal $S_u$ intended for its station from the output signal of the electrooptical converter 22. Since the channel is the same for all these stations, the signals intended for the different sub-stations are transmitted in a multiplex signal. This may be effected, for example, by time-multiplexing, frequency-multiplexing or multiplexing the subcarriers or a combination thereof.

Figure 3A:
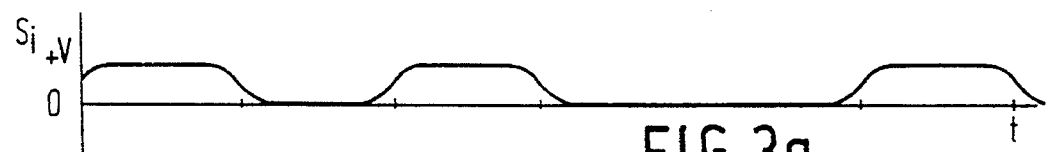
FIG. 3 shows signal shapes that may occur in the sub-station as shown in FIG. 2.
Figure 3B:
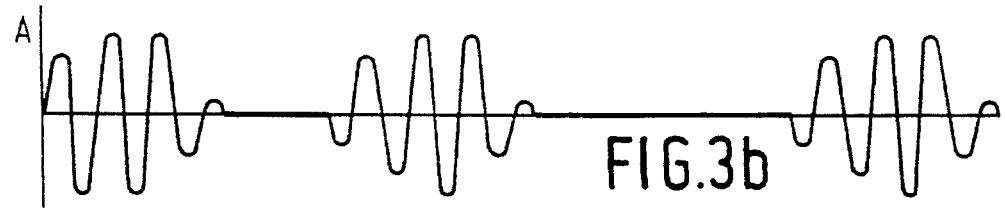
Figure 3C:
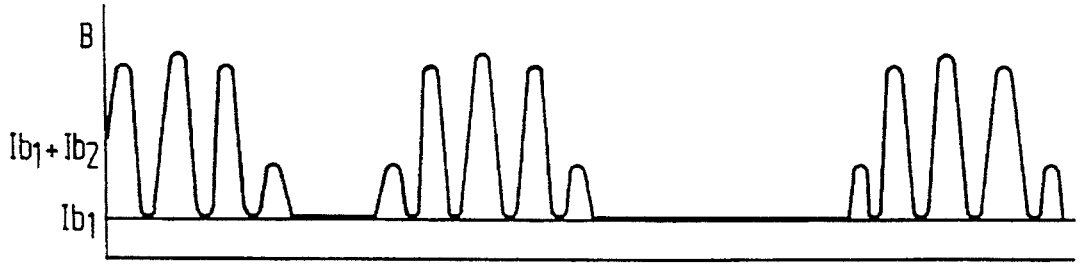

FIG. 3a shows a possible time pattern of the filtered and coded signal $S_i$. FIG. 3b shows the associated modulated auxiliary signal which may adopt both positive and negative values. FIG. 3c represents the input signal of the electrooptical converter 26, it being discernable that in the absence of the subcarrier the constant value added to the output signal of the auxiliary modulator 30 is reduced compared with the constant value added to the output signal of the auxiliary modulator in the presence of the subcarrier.

Figure 4:
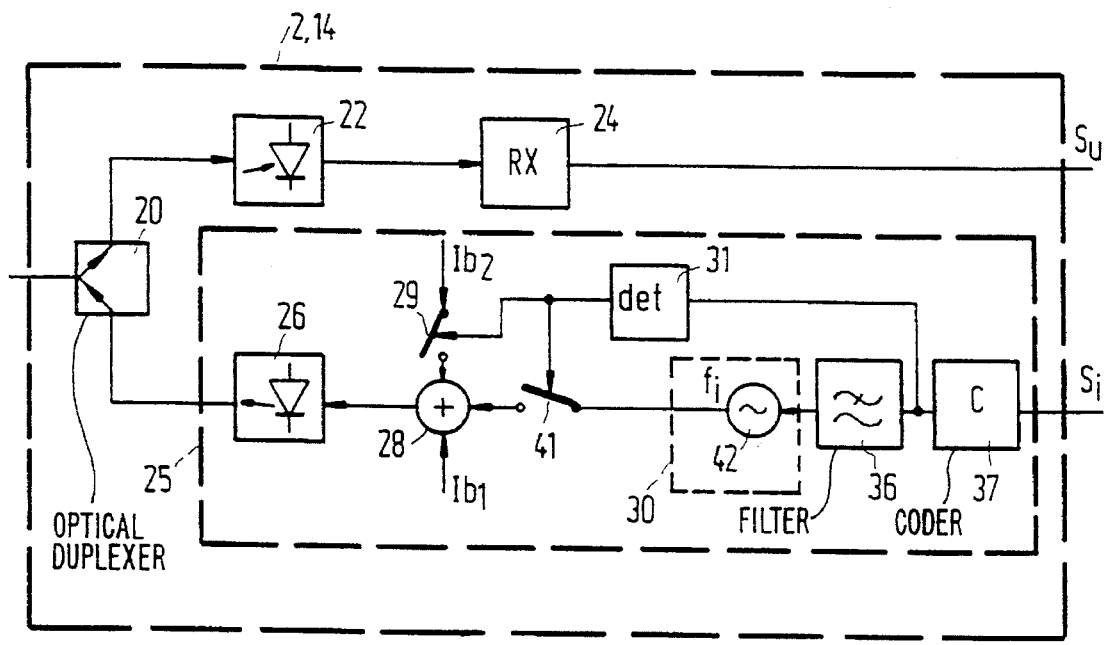
FIG. 4 shows an alternative embodiment for a sub-station to be used in a telecommunication network according to the invention.

At the sub-station 2 shown in FIG. 4 the input signal $S_i$ is applied to a transmitter 25. In the transmitter 25 the source signal $S_i$ is applied to an input of an auxiliary modulator 30 via coding means 37 and a low-pass filter 36. The auxiliary modulator 30 comprises an oscillator 42 for generating the subcarrier having a mean frequency $f_i$, which can be frequency modulated by the input signal of the auxiliary modulator. To this end the oscillator 42 is frequency controllable. The output of the auxiliary modulator 30 is connected to a first input of an adder circuit 28 via a switch 41. A constant value $I_{b1}$ is applied to a second input of the adder circuit 28 while the third input of the adder circuit is supplied with a constant value $I_{b2}$ via a switch 29. The switches 29 and 41 are controlled here by the output signal of a detector 31 which determines whether the coded signal $S_i$ contains information. The switch 29 forms the reducing means for reducing the mean amplitude of the transmit signal according to the inventive idea. The output of the adder circuit 28 is connected to an input of a return modulator, in this case being an electrooptical converter 26. The output of the electrooptical converter 26 carrying the transmit signal for its output signal is connected to a first input of an optical duplexer 20. An output of the optical duplexer 20 is connected to an optoelectrical converter 22 whose output is connected to the input of a receiver 24. On the output of the receiver 24 an output signal $S_u$ is available.

The auxiliary modulator 30 generates a frequency modulated subcarrier in response to the input signal $S_i$. This is effected by applying a signal $S_i$ either coded or not by a filter 36 to a frequency input of the frequency controllable oscillator 42. By means of the detector 31 there is established whether the signal $S_i$ contains useful information. This may be established by counting the number of successive digital symbols having a logic "0" value and assuming that no useful information is transferred if a specific value of this number of symbols is exceeded.

If useful information is transmitted, the switches 29 and 41 are closed and a signal formed by the sum of the modulated subcarrier and a constant value $I_{b1}+I_{b2}$ is available on the input of the electrooptical converter 26. If no useful information is transmitted, the switches 29 and 41 are open and only a signal having a constant residual value $I_{b1}$ is applied to the electrooptical converter. This means that in the absence of useful information only a small signal is transmitted by the electrooptical converter, so that the consequent interference remains limited.

It is possible that the residual value $I_{b1}$ could be equal to zero. However, this generally leads to a reduced modulation rate, because the optoelectrical converter needs a certain period of time to switch on again from the fully switched-off state. If a reduced modulation rate is permissible, it may be advantageous to fully switch off the optoelectrical converter when an auxiliary signal is disabled.

The coder 37 may be, for example, a pulse position coder. Such a pulse position coder converts a binary input signal which may have a logic "0" or "1" value in each symbol period into a pulse position modulated signal in which the information is coded by the position a single pulse takes up in a number of symbol periods. For example, groups of three symbols are converted into a pulse position coded signal, this coding is carried out in that for each of the eight possible combinations of the three binary symbols the pulse takes up one of eight possible disjunct positions over three symbol intervals of the input signal.

The use of pulse position coding calls forth a larger bandwidth, but also results in a shorter period of time on average in which the subcarrier, and thus the transmit signal, is enabled, so that the mutual interference by the sub-stations may be reduced considerably.

The low-pass filter 36 provides a limitation of the bandwidth of the output signal of the coder 37 so as to limit the bandwidth of the transmit signal.

The receive section of the sub-station as shown in FIG. 4 is identical with the receive section of the sub-station shown in FIG. 3 which has been explained earlier.

Figure 5:
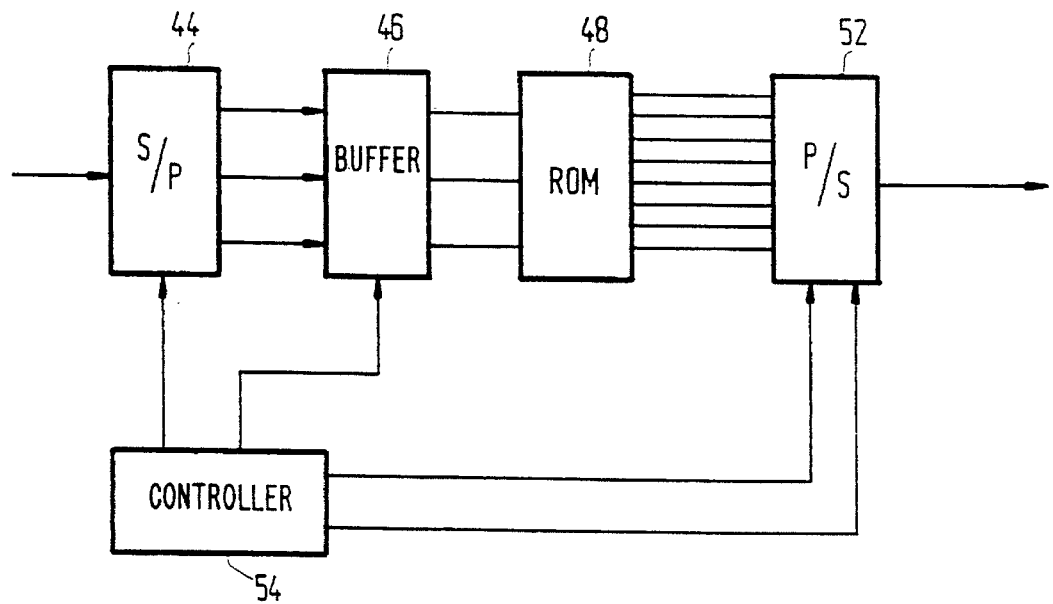
FIG. 5 shows coding means to be used in a telecommunication network according to the invention.

In the coder shown in FIG. 5 an input signal $S_i$ is applied to a serial input of a shift register 44. Three parallel outputs of the shift register 44 are connected to three inputs of a buffer 46. Three outputs of the buffer 46 are connected to three address inputs of a ROM 48. 8 data outputs of the ROM 48 are connected to 8 inputs of a shift register 52. A first output of a controller 54 is connected to a clock input of the shift register 44. A second output of the controller 54 is connected to a control input of the buffer 46. A third output of the controller 54 is connected to a control input of the shift register 52 and a fourth output of the controller 54 is connected to a clock input of the shift register 52.

In the shift register 44 successive symbols of the signal $S_i$ are clocked. For this purpose the first output of the controller 54 carries a clock signal having a clock rate corresponding to the symbol rate of the signal $S_i$. Once three symbols have been clocked in the shift register 44, the controller 54 produces on its second output a pulse which causes the three symbols to be transferred to the buffer 46. The transferred symbols are used as an address for the ROM 48 which produces codewords on its eight outputs. If pulse position modulation is used, only one out of eight outputs of the ROM 48 is active each time. Alternatively, however, it is conceivable that a coding is used with which several outputs of the ROM 48 are active. These output symbols of the ROM 48 are transferred to the shift register 52 in response to a pulse coming from the controller 54, and then made available on the output of the shift register 52 in response to the clock signal on the fourth output of the controller 54. The rates of the clock signals applied to the shift register 44 and the shift register 52 are to have a ratio of 3 to 8.

Figure 6:
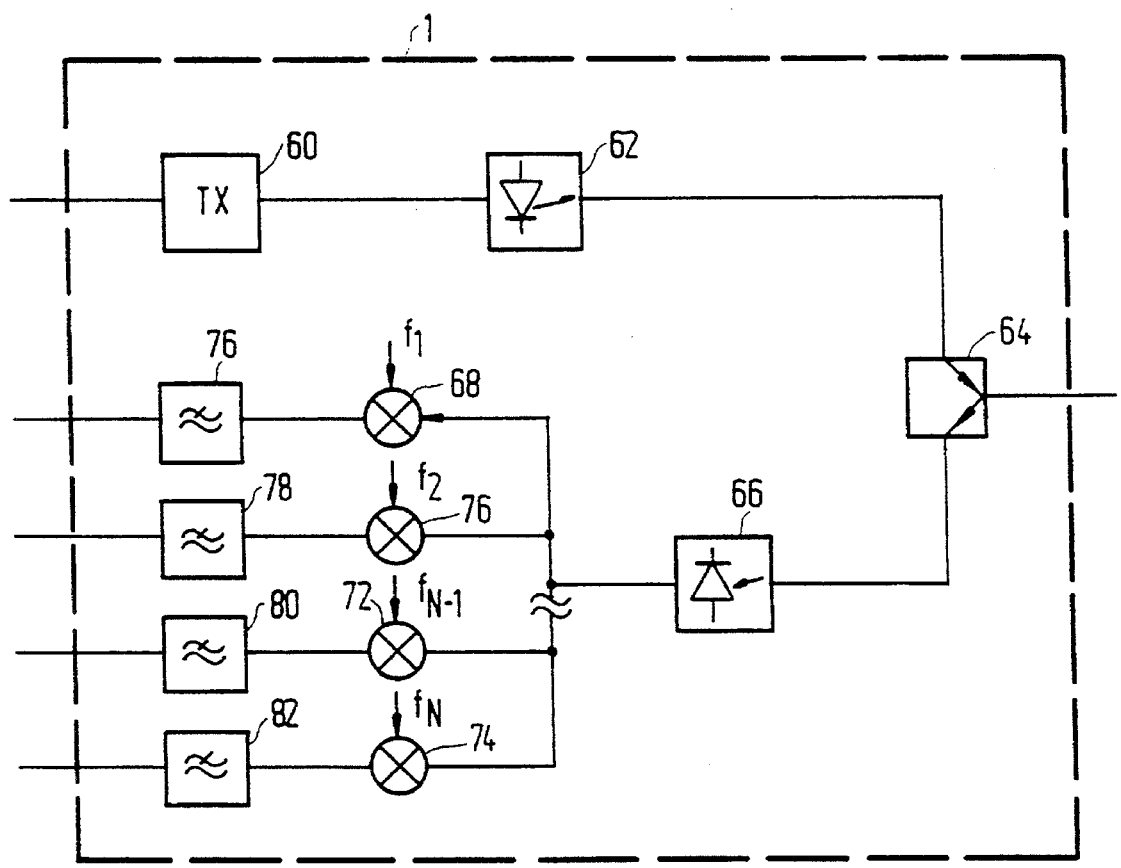
FIG. 6 shows a main station to be used in the telecommunication network according to the invention.

At the main station shown in FIG. 6 the signals to be transmitted are applied to a transmitter 60. The output of the transmitter 60 is connected to the input of an electrooptical converter 62 whose output is connected to an input of an optical duplexer 64.

A combined input/output of the optical duplexer is coupled to the channel. An output of the optical duplexer 64 is connected to an optoelectrical converter 66 whose output is coupled to a first input of a plurality of mixer stages 68, 70, 72 and 74. A second input of each mixer stage is supplied with a local oscillator signal having a frequency $f_i$ that differs for each mixer stage, with i=1 . . . N. The output of the mixer stage 68 is connected to an input of a low-pass filter 76; the output of the mixer stage 70 is connected to an input of a low-pass filter 78; the output of the mixer stage 72 is connected to the input of a low-pass filter 80 and the output of the mixer stage 74 is connected to the input of a low-pass filter 82.

The signals to be transmitted by the main station 1 to the sub-stations are combined into a combined signal in the transmitter 60. This may be effected, for example, by means time-multiplexing or by modulating the different signals on different subcarriers. The output signal of the transmitter 60 is converted into an optical signal by the electrooptical converter 62, which signal is fed to the channel through the optical duplexer 64.

An optical signal coming from the channel is converted into an auxiliary signal by the optoelectrical converter 66, which auxiliary signal comprises the signals of the sub-stations modulated on their own subcarrier frequencies. The frequencies of the subcarriers applied to the mixer stages 68 . . . 74 correspond to the frequencies of the subcarriers used by the various sub-stations.

If the subcarriers in the sub-stations are amplitude modulated by the transmit signal, the output of each mixer stage presents a demodulated signal whose subcarrier frequency corresponds to the subcarrier in a certain sub-station. By letting the low-pass filters 76 . . . 82 remove all further frequency components that exceed the maximum frequency from the data signals transmitted by the sub-stations, the output of each low-pass filter carries a signal coming from one specific sub-station.

What is claimed is:

1. A sub-station for use in a telecommunication network comprising a main station, a plurality of sub-stations, and a common channel for transmission of information signals from the sub-stations to the main station; said sub-station comprising:

auxiliary modulating means for generating an auxiliary signal by modulating an information signal on a sub-carrier having a predetermined frequency which is uniquely assigned to said sub-station to distinguish from subcarrier frequencies assigned to other sub-stations in said network;

primary modulating means coupled to said auxiliary modulating means to receive said auxiliary signal and modulate it on a carrier having a predetermined frequency which is substantially the same for all sub-stations in said network, resulting in a modulated carrier which is a transmit signal for transmission over said channel; and reducing means coupled between said auxiliary modulating means and said primary modulating means which, in response to said auxiliary signal, reduces the amplitude of said modulated carrier transmit signal during intervals in which said auxiliary signal has an amplitude at or below a predetermined reference level thereof.

2. A sub-station as claimed in claim 1, wherein said primary modulating means comprises an electrooptical converter.

3. A sub-station as claimed in claim 1, wherein said information signal is in digital form having active and inactive symbol periods, and said sub-station further comprises coding means for converting the digital information signal into a coded signal for modulating said carrier, the coded signal also having active and inactive symbol periods, the active symbol periods of the coded signal together occupying less time than the active symbol periods of the digital information signal.

4. A sub-station as claimed in claim 3, wherein said coded signal is a pulse position modulated signal.

* * * * *